Dec. 10, 1929.　　　J. G. BLUNT　　　1,739,283
TRUCK CENTERING DEVICE
Filed Sept. 17, 1926　　2 Sheets-Sheet 1
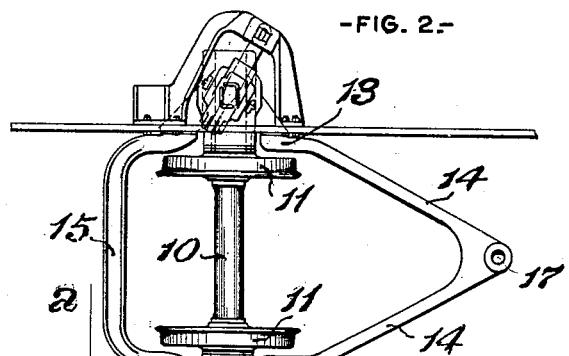
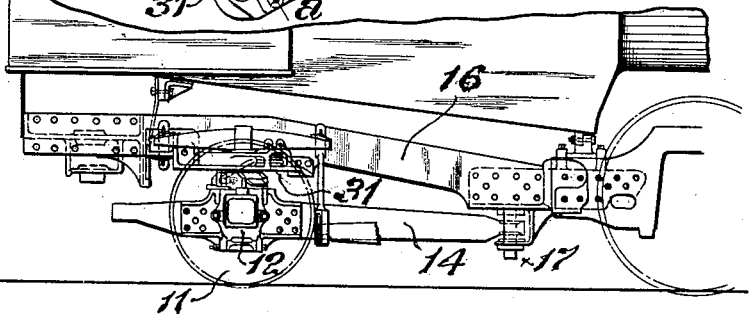
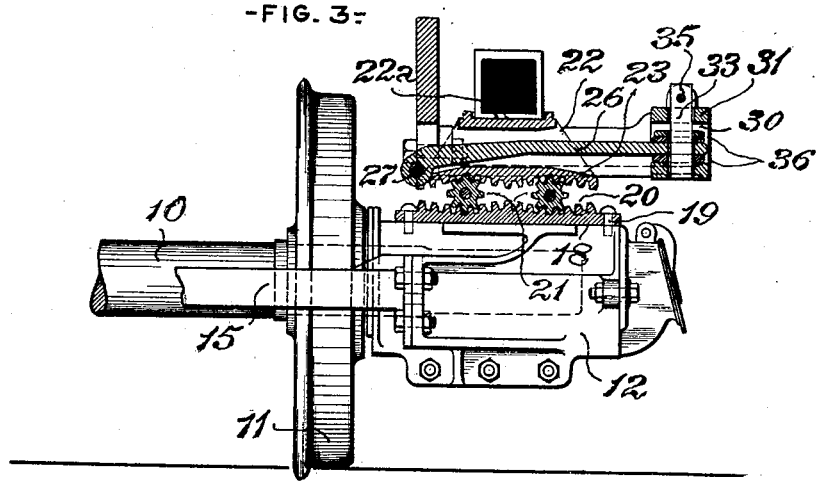

Dec. 10, 1929. J. G. BLUNT 1,739,283
TRUCK CENTERING DEVICE
Filed Sept. 17, 1926 2 Sheets-Sheet 2
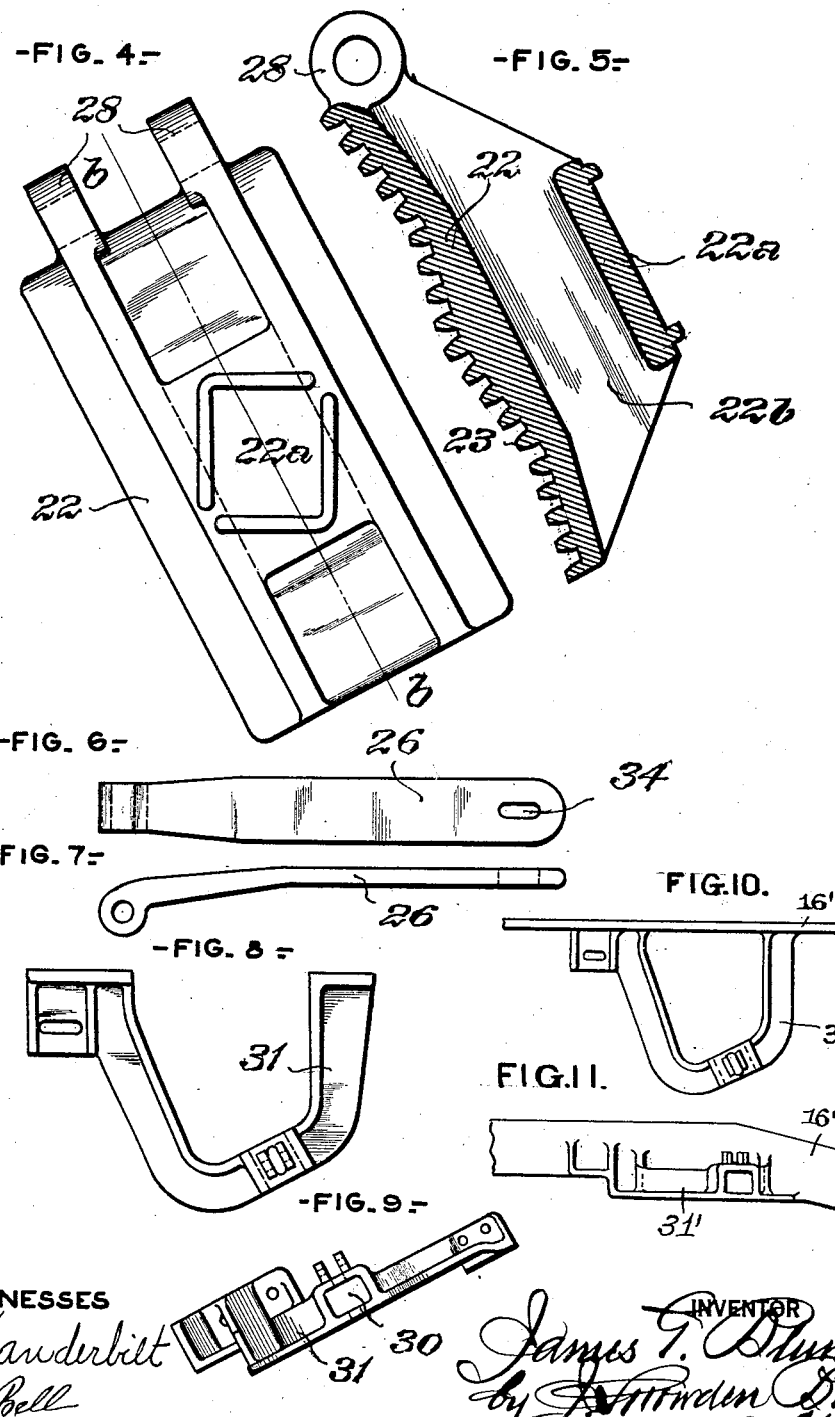

Patented Dec. 10, 1929

1,739,283

UNITED STATES PATENT OFFICE

JAMES G. BLUNT, OF SCHENECTADY, NEW YORK

TRUCK-CENTERING DEVICE

Application filed September 17, 1926. Serial No. 136,058.

My invention relates, generally, to centering devices for locomotive trucks, and, particularly, is an improvement upon that for which Letters Patent of the United States No. 1,524,775 were granted and issued to me, under date of February 3, 1925. The object of my invention is to provide improved means for securing the spring seat link to the locomotive frame, such means being of simpler and more durable construction than the floating yokes heretofore employed.

The improvement claimed is hereinafter fully set forth.

One of the characteristic features of trucks of the class set forth in my Letters Patent No. 1,524,775 aforesaid, consists in yokes, hinged to the frame structure of the locomotive, in such manner as to accommodate the rise and fall of the truck axle, relatively thereto, said yokes being so connected to spring seats, resting on the tops of the journal boxes, as to maintain the springs parallel with the longitudinal central plane of the locomotive. Suitable resistance devices, such as geared rollers, are interposed between the spring seats and rack seats, on the tops of the journal boxes, to permit lateral displacement of the truck, to conform to the curvature of the track. An important feature of my present invention is that the hinge connection of the yokes is dispensed with, and in lieu thereof, a yoke or bracket, for securing the spring seat link, is rigidly secured to the frame, thus providing a construction which is more economical to manufacture, and which is more durable in service, than the hinged or floating yoke.

In the accompanying drawings: Figure 1 is a partial side view, in elevation, of the rear end of a locomotive embodying my invention; Fig. 2, a top or plan view, with the boiler and fire box removed, of the construction shown in Fig. 1; Fig. 3, a vertical transverse section, on an enlarged scale, on the line a a of Fig. 2; Fig. 4, a top or plan view of the upper roller seat and spring seat; Fig. 5, a longitudinal section, on the line b b of Fig. 4; Fig. 6, a top or plan view of the spring seat link; Fig. 7, a side view, in elevation, of the same; Fig. 8, a top or plan view of the yoke for securing the spring seat link; Fig. 9, an end view, in elevation, of the yoke shown in Fig. 8; Fig. 10, a fragmentary plan view of the locomotive frame and spring seat yoke formed integrally; and, Fig. 11, a side view of the same.

In the practice of my invention, referring descriptively to the specific embodiment thereof which is herein exemplified, as applied in a locomotive having a two wheel trailing truck, in which an axle, 10, on which a pair of wheels, 11, is secured, is fitted to rotate in journal boxes, 12, which are mounted in the side members, 13, of the truck frame, said members being formed integral with forwardly and inwardly extending radius bar arms, 14, and a rear transverse bar, 15. The truck frame is, in the usual manner, pivotally connected to the main frame, 16, of the locomotive, by a radius bar pin, 17, located in the longitudinal central plane of the truck, at the forward extremity of the radius bar arms.

A lower roller seat, 18, is located on the top of each of the journal boxes, 12, and is secured thereto, in this instance, by dowels, or, as shown, by bolts, 19, and by welding around its edges. The upper faces of the roller seats, 18, are provided with alternately oppositely inclined racks, 20, the teeth of which are engaged by the teeth of a pair of rollers, 21. Superposed on the rollers, 21, are the upper roller seats, 22, having, on their lower faces, racks, 23, oppositely inclined with relation to each other and to the lower racks, 20. The teeth of the upper racks mesh with the teeth of the rollers, 21. The upper and lower roller seats, and the interposed rollers, provide a lateral motion device adapted to permit the truck to move laterally with relation to the main frame, on curved track, and to restore the truck to central position on tangent track.

The spring seats, 22ª, are supported above the upper roller seats, 22, by the spaced side walls, 22ᵇ. The spring seat, side walls, and upper roller seat, are preferably formed as an integral casting, having a pocket extending longitudinally therethrough, which receives the spring seat link, 26. The link is hingedly secured to the casting by a pin, 27, passing through the lugs, 28, on the casting, and through an eye at one end of the link. The opposite end of the link fits in a pocket, 30, formed in the yoke, 31, rigidly secured to the locomotive frame by the bolts, 32. Each link is secured to its yoke, by a pin, 33, oblong in cross section, which passes through similarly shaped slots in the upper and lower walls of the pocket, and through a similarly shaped slot, 34, in the end of the link. The pins are disposed with their long cross sectional dimension placed in the direction of greatest stress, and are secured in place by cotter pins, 35. Suitable liners, 36, are fitted on the pins, 33, on both sides of the links, to position them in the pockets, with the capacity of proper movement.

It will be observed that, by hingedly connecting the links to the spring seats, the necessity for hingedly connecting the yokes to the frame, is dispensed with, and that yokes rigidly secured to the frame can be employed, thus effecting a great economy in manufacturing cost, and providing a more durable structure.

It is within the contemplation of the invention to employ, in lieu of the yokes or brackets shown, any suitable form of bracket for receiving the ends of the spring seat links. It is also within the contemplation of the invention to form the spring seat yoke and frame as a one piece casting. Such integral structure is shown in Figs. 10 and 11, wherein the side members of the main frame, 16′, are integrally formed with the yokes, 31′.

I claim as my invention and desire to secure by Letters Patent:

1. The combination of a locomotive frame; and a spring seat yoke, rigidly secured thereto.

2. An integral casting, comprising a locomotive frame, and a spring seat yoke.

3. In a locomotive, the combination of a locomotive frame; a truck frame, pivotally connected thereto; journal boxes, fitted in the truck frame; springs, transmitting weight from the locomotive frame to the truck frame; springs seats, supporting said springs; means, interposed between the spring seats and the journal boxes, adapted to permit lateral movement of the truck frame on curved track, and to restore it to central position on tangent track; brackets, rigidly secured to the locomotive frame; and a link, having one end hingedly connected to the spring seat and its opposite end connected to the bracket.

4. In a locomotive, the combination of a locomotive frame; a truck frame, pivotally connected thereto; springs, transmitting weight from the locomotive frame to the truck frame; spring seats, supporting said springs; means, interposed between the spring seats and the journal boxes, adapted to permit lateral movement of the truck frame on curved track, and to restore the truck frame to central position on tangent track; brackets, each formed with a pocket, and formed integrally with the locomotive frame; and links, having one end hingedly connected to a spring seat and their opposite ends movably connected to the pocket of the bracket.

5. In a locomotive, the combination of a locomotive frame; a truck frame, pivotally connected thereto; springs, transmitting weight from the locomotive frame to the truck frame; a combined spring seat and upper roller seat, formed with a pocket for receiving one end of the spring seat link; a lower roller seat, mounted on a journal box; a roller, interposed between the upper and the lower roller seats adapted to permit relative movement of the truck frame on curved track, and to restore the truck frame to central position on tangent track; a bracket, rigidly secured to the locomotive frame; and a link, having one end hingedly secured in the pocket of the combined spring seat and upper roller seat; and its opposite end movably connected to the bracket.

6. An integral casting for truck centering devices, comprising a spring seat, and an upper roller seat, the said seats being spaced one above the other to provide a pocket for the passage of one end of a spring seat link, between the seats.

7. The combination of an upper roller seat for truck centering devices; a spring seat; and means for holding said seats in spaced relation, to provide a pocket for the reception of one end of a spring seat link.

JAMES G. BLUNT.